Sept. 9, 1952          H. A. KULJIAN          2,609,587
FILAMENT STORING AND ADVANCING REEL
Filed May 17, 1950
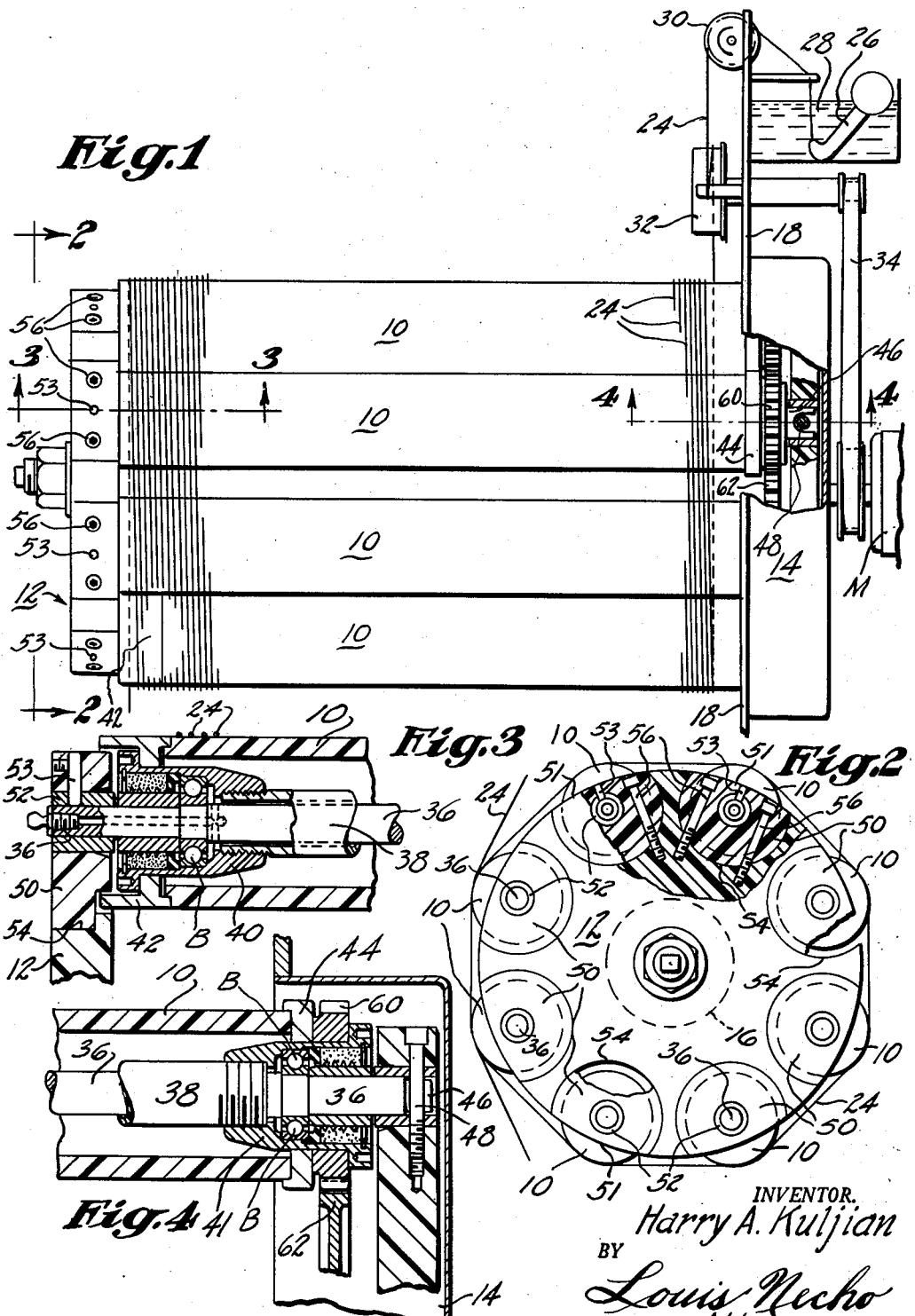

UNITED STATES PATENT OFFICE 2,609,587

FILAMENT STORING AND ADVANCING REEL

Harry Asdour Kuljian, Merion, Pa.

Application May 17, 1950, Serial No. 162,578

5 Claims. (Cl. 28—71.7)

One type of thread storing and advancing reel which is used in the manufacture, or in the processing, of filaments includes a number of rolls arranged in a circle about a central axis, and means for rotating the rolls about their individual axes, the axes of the rolls being skewed with respect to said central axis whereby when the rolls are rotated, a filament wound about the reel will move, in the form of a helix circumscribing all of the rolls, from one end of the reel toward the other end thereof. While the filament is moving longitudinally of the reel, it is subjected to treatment by various liquids and is dried before or after leaving the reel.

One object of the invention is to produce an improved reel of this type.

The rolls forming the reel may be made of a synthetic or of a natural material which is not a good conductor of heat and which is not corroded by the various chemicals used in the regeneration, or in the processing, of the filament. Because such rolls must also be accurately machined, because they must be maintained in substantially perfect alignment, and because they must have smooth surfaces, it follows that the rolls have to be dismantled or removed from the reel, from time to time, for replacement or repair.

It is therefore a further object of the invention to produce an improved reel construction whereby any one of the rolls constituting the filament storing and advancing reel may be readily removed and re-assembled, with minimum skill, time or effort, and without in any way interfering with, or dismantling, any other roll or any other part of the reel.

These and other objects are attained by my invention as set forth in the following specification and as shown in the accompanying drawings in which Fig. 1 is a side elevational view of a filament storing and advancing reel embodying my invention, certain parts being broken away to show details of construction.

Fig. 2 is an end elevational view looking in the direction of line 2—2 on Fig. 1, certain parts being broken away to show details of construction.

Fig. 3 is an enlarged sectional view on line 3—3 on Fig. 1.

Fig. 4 is an enlarged sectional view on line 4—4 on Fig. 1.

The reel shown in Fig. 1 includes a number of hollow rolls 10 the opposite ends of which are rotatably supported in opposite end plates 12 and 14 which are interconnected by means of a centerpost 16. The end plate 14 is supported by any suitable frame 18 so that the reel, as a whole, is supported in cantilever fashion. The filament 24 may be already in existence, or it may be produced by extruding an appropriate solution, through a spinnerette 26, into a coagulating bath 28, and passing the filament over a guide roll 30 and over one or more godet wheels 32 before the filament is wound about the receiving or right hand end of the reel as shown in Fig. 1. The godet wheel 32 may be rotated by any suitable means such as a belt 34 passing over a pulley on the shaft of motor M and over a pulley on the shaft of the godet wheel. The structure thus far described forms no part of the present invention and therefore need not be described in further detail. Also, the manner in which the filament is treated with various liquids as it moves over the reel and the manner in which it is dried forms no part of the invention and is therefore not shown nor described.

In all prior reel construction of this type of which I am aware, the rolls are so assembled and secured in position that one of the rolls can not be removed without dismantling some or all of other rolls or other parts of the reel.

Each of the rolls of the reel embodying my invention includes a fixed supporting axle or shaft 36 over which is fitted a pipe 38 the opposite ends of which threadedly engage hubs 40 and 41, as shown in Figs. 3 and 4. The hubs 40 and 41 carry, respectively, two end sockets 42 and 44 which are adapted to engage the opposite ends of the hollow roll 10 to clamp and center the roll.

The hubs 40 and 41 are rotatable on conventional ball bearing B as shown in Figs. 3 and 4. The right hand end of the axle 14 terminates in a fork or U-shaped portion 46 which is adapted to engage a bolt or other fixed member 48 to prevent rotation of the axle. At its left hand end, the axle carries a segment 50 the outer periphery 51 of which forms part of a circle the center of which coincides with the axis of the roll. The segment 50 is carried by a bushing 52 to which it is secured by a set screw 53.

The periphery of end plate 12 is provided with round recesses 54 for seating the segments 50 as best shown in Figs. 2 and 3. Each segment is secured in position in its recess 54 in the periphery of end plate 12 by two countersunk bolts 56.

To remove any one of the rolls it is merely necessary to disengage bolts 56 whereupon the roll is pulled to the left as viewed in Figs. 1, 3 and 4, to disengage the forked end 46 of the axle from bolt 48. To reassemble the roll it is held in its approximate position and is pushed to the right until the forked end 46 of the axle 36 engages bolt 48. The left hand end of the roll is now moved toward end plate 12 until its segment 50 is seated in its recess 54. By moving the roll to the right or to the left the holes of bolts 56 in the segment 50 will be brought into registration with corresponding holes in end plate 12. The bolts 56 are now dropped in position and tightened. It will be noted that the left hand vertical surface of segment 50 is flush with corresponding vertical surface of end plate 12. In other words, when the segments 50 are secured in position they form part of the end plate 12 as best shown in Figs. 1 and 2.

Each roll 10 is rotated about its axis by means of a gear 60 carried by hub 41 and meshing with a ring gear 62 carried by the shaft of motor M.

From the foregoing it will be seen that each roll 10, its supporting axle 36, its ball bearing B, and its gear 60, are all removable, as a unit, by merely disengaging bolts 56 and sliding the roll in a direction to disengage the forked end 46 of the axle from bolt 48, and that the roll is reassembled by merely reversing the process. It is to be noted that removal of one of the rolls does not in any way affect the adjacent rolls or any other part of the reel.

What I claim is:

1. A filament storing and advancing reel comprising a first end support, a second end support spaced from, and coaxial with said first support, a plurality of individually rotatable rolls disposed between said supports, and means for securing each of said rolls in position in an individually removable manner, said means including an abutment on said first support, one end of said roll being engageable with and disengageable from said abutment by movement of the roll toward, or away from, said first support in the direction of the axis rotation of said roll, and fastening means engageable with, and disengageable from the other end of said roll and said second end support for detachably securing said other end of said roll to said second support.

2. For use as part of a filament storing and advancing reel of the type which comprises a first end support, a second end support, and a number of individually rotatable rolls disposed between said supports, each of said rolls including an axle, an elongated cylindrical body rotatably mounted on said axle means for removably securing said roll in position, said means including an abutment carried by said first end support, a first end of said axle being engageable with, and disengageable from, said abutment by movement of said axle, in the direction of the axis of rotation of the roll, toward or away from said first end support, to prevent rotation of said axle, and fastening means engageable with, and disengageable from, the second end of said axle and said second support for preventing movement of said axis in the direction of rotation of said roll.

3. A thread advancing reel including a first end support, a second end support, there being an arcuate recess in the periphery of one of said supports, an elongated roll, a segment carried by one end of said roll and adapted to seat in said recess, and means detachably securing the ends of said roll to said supports.

4. The structure recited in claim 3 and a pinion carried by the other end of said roll and adapted, when said roll is in position, to mesh with a driving gear carried by the other of said supports.

5. For use as a part of thread storing and advancing reel of the type which includes a first support and a second support, a roll, an axle about which said roll rotates, means in said first support for detachably receiving one end of said axle, a segment carried by the other end of said axle and adapted to seat in a corresponding recess in the periphery of said second support, and means for detachably securing said segment to said support.

HARRY ASDOUR KULJIAN.

REFERENCES CITED

The following references are of record in the file of this patent:

UNITED STATES PATENTS

| Number | Name | Date |
| --- | --- | --- |
| 1,292,799 | Kendall | Jan. 28, 1919 |
| 1,893,574 | Anderson | Jan. 10, 1933 |
| 1,920,224 | Weaver | Aug. 1, 1933 |